United States Patent
Lesueur

[11] 3,708,747
[45] Jan. 2, 1973

[54] OPTICAL CURRENT TRANSFORMER

[75] Inventor: Gilbert Lesueur, Aix-Les-Bains, France

[73] Assignee: Alsthom-Savoisienne, Saint-Owen, France

[22] Filed: Oct. 22, 1971

[21] Appl. No.: 191,664

[30] Foreign Application Priority Data

Oct. 23, 1970 France..................................7038389

[52] U.S. Cl....................................324/96, 250/225
[51] Int. Cl.................................................G02f 1/13
[58] Field of Search ..........324/96, 97, 142; 250/225

[56] References Cited

UNITED STATES PATENTS

| | | | |
|---|---|---|---|
| 3,413,055 | 11/1968 | DeSorbo | 324/96 |
| 3,419,802 | 12/1968 | Pelenc | 324/96 |
| 3,506,833 | 4/1970 | Von Willisen | 324/96 |
| 3,662,263 | 5/1972 | Bensel | 324/96 |
| 3,581,202 | 5/1971 | Pelenc | 324/96 |

Primary Examiner—Archie R. Borchelt
Assistant Examiner—D. C. Nelms
Attorney—Richard C. Sughrue et al.

[57] ABSTRACT

An optical current transformer in which two light beams coming from the same source successively pass through: (1) a first polarizer, a first material having a magnetic rotational power influenced by the electrical current to be measured and a first analyzer, to end up on a photoelectric detector; and (2) a second polarizer, a second material having a magnetic rotational power influenced by a measuring electrical current and a second analyzer, to end up on the same photoelectric detector. The measuring current is dependent on the detector for maintaining a constant flux on the latter. The angle between the polarization planes of the polarizers and the analyzers of each pair is 45°.

4 Claims, 1 Drawing Figure

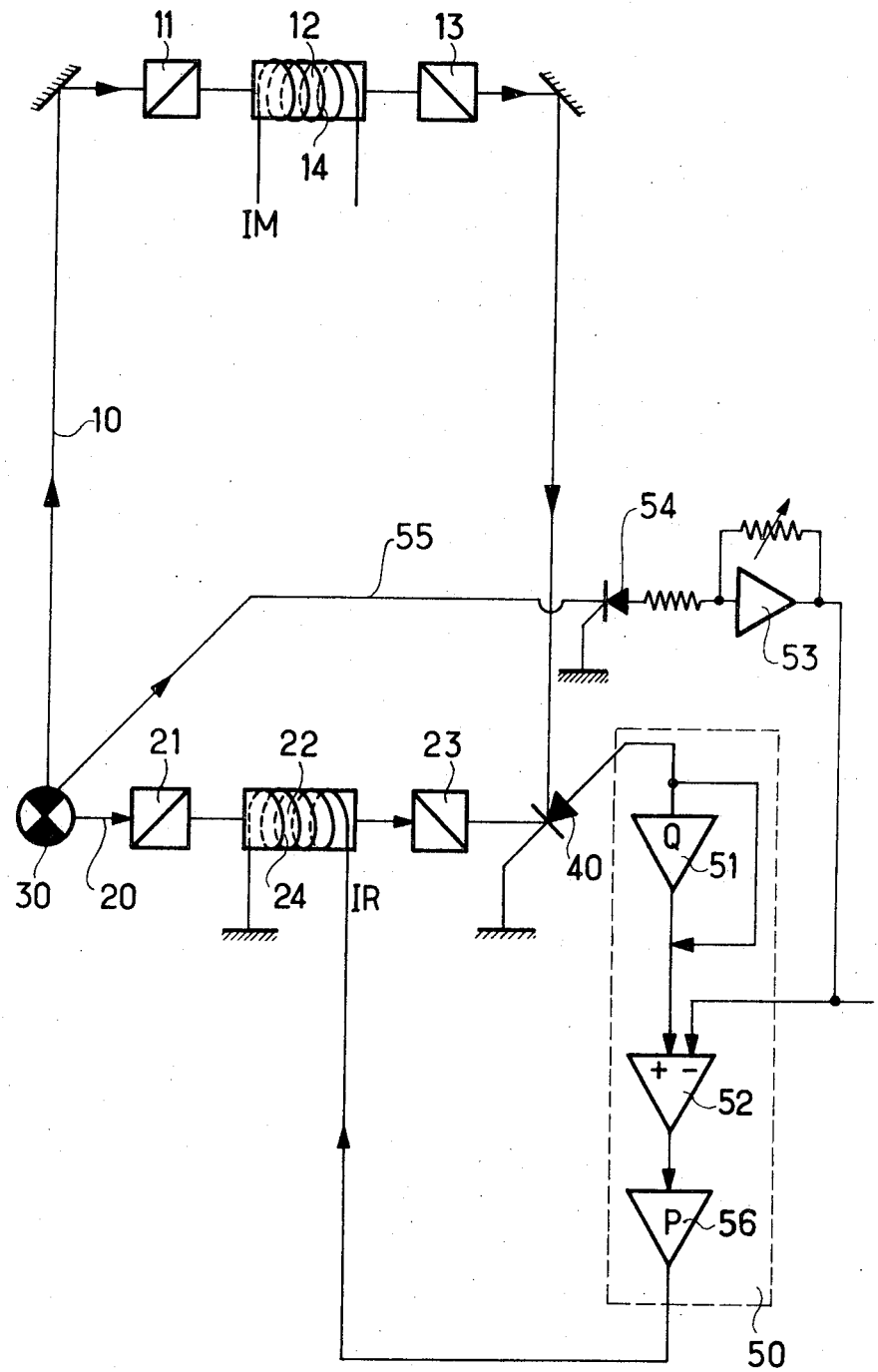

OPTICAL CURRENT TRANSFORMER

BACKGROUND OF THE INVENTION

1. Field of the Invention

This invention relates to a device for measuring the magnitude of an electrical current, using the Faraday effect.

2. Description of the Prior Art

In known devices of this kind, a polarized light beam traverses a material, such as flint-glass, with a magnetic rotating power subject to a magnetic field produced by an electrical current whose intensity or magnitude is to be measured. In the material with the magnetic rotating power, the polarization plane of the light beam undergoes rotation. The angle of this rotation is proportional to the instantaneous value of the magnitude or intensity of the component of the magnetic field which is parallel to the direction of the beam. The light beam then traverses an analyzer which transforms the change of light polarization angle into a variation in the intensity of the light flux. The latter is detected by a photoelectric detector.

It has already been proposed, in an effort to increase precision, to employ a measurement method by means of compensation which consists of canceling out the rotation of the polarization plane of the light beam by means of a rotation in the opposite direction through the same angle. This rotation in the opposite direction is obtained by interspersing, in the path of the light beam and upstream from the analyzer, a material with a magnetic rotating power and suitably placed in a magnetic field produced by a current which is the measuring current.

This compensation method involves numerous inconveniences. It increases the losses in light transmission; in effect, the light beam must successively go through two materials with magnetic rotating power, instead of just one. On the other hand, the beam must be kept polarized between the two materials with the magnetic rotating power; in the case where the material serving for the measurement and the material serving for compensation are far removed from each other (for example, for reasons of electrical insulation), this setup requires expensive light beam guidance devices. Above all, the electrical energy used for compensation is rather considerable, because this method always requires an equal number of compensation ampere-turns.

SUMMARY OF THE INVENTION

The object of the invention is to provide an optical current transformer which is as precise as transformers using the compensation method mentioned above and which considerably reduces the electric power consumption, while permitting light to be guided by optical fibers, because the light transmitted through a certain distance is not polarized.

The optical current transformer, according to the invention, is remarkable by virtue of the fact that it involves two light beams, the first of which successively passes through the following: a first polarizer, a first material with magnetic rotating power and placed in a magnetic field produced by a current to be measured, a first analyzer, and then impinging upon a photoelectric detector; the second one of these light beams passes successively through the following: a second polarizer, a second material with magnetic rotating power and placed in a magnetic field produced by a current which is the measuring current, a second analyzer, and then impinging upon the same photoelectric detector. Electronic means adjust the measuring current as a function of the light flux received by the photoelectric detector, so as to keep this flux at a constant value equal to one half of the flux which would be received by the photoelectric detector if the polarization plane of the first or second light beam were merged, respectively, upon leaving the first or second material with magnetic rotating power, with the polarization plane of the first or second analyzer. The angle between the polarization planes of the polarizer and the analyzer is 45° for each of the two light beams.

Later on we will see that the simultaneous implementation of these conditions enables us to obtain a simple relation: equality or proportionality between the current to be measured and the measuring current.

BRIEF DESCRIPTION OF THE DRAWING

The single figure is a schematic diagram illustrating one way of implementing the invention, given here by way of example, without any restrictions.

DESCRIPTION OF THE PREFERRED EMBODIMENT

Two light beams 10 and 20 are transmitted by one and the same light source 30, but they could also be transmitted by different sources. The light beam 10 successively passes through the following: a polarizer 11, a body 12 with a magnetic rotating power, and an analyzer 13. It is then directed toward a photoelectric detector 40. The light beam 20 successively passes through the following: a polarizer 21, a body 22 with magnetic rotating power, and an analyzer 23. It is then directed, like beam 10, to the photoelectric detector 40. The body 12 is subjected to the magnetic field of a winding 14 through which the current $I_M$ to be measured runs. The body 22 is subjected to the magnetic field of a winding 24 through which runs a measuring current $I_R$ which is regulated by an electronic servo device 50 energized by the electrical signal transmitted by detector 40.

In one preferred version, the bodies 12 and 22 are, for example, dense flint-glasses and have the shape of a cylinder. Each one of them is arranged so as to be traversed along its axis by one of the light beams 10 and 20. In order to reduce the lengths of the paths where the light beams must remain polarized, the polarizers and the scanners can be arranged against the faces of bodies 12 and 22. In the portions of their paths included between the light source 30 and polarizers 11 and 21, and between analyzers 13 and 23 and the photoelectric detector 40, the light beams 10 and 20 can be guided by optical fibers. This property is interesting and worthwhile when body 12, influenced by the magnetic field of the current $I_M$ to be measured, is separated from the light source 30 and from the photoelectric detector 40, for reasons of electrical insulation.

The elements in the upper part of the figure: references 11, 12, 13, 14, are arranged, for example, at the top of a support insulator, and the other elements of the figure are at the bottom of this insulator support.

The polarization plane of polarizer 11 makes an angle $\phi_1$ of $\pm 45°$ with that of the analyzer 13; likewise, the polarization plane of polarizer 21 makes an angle $\phi_2$ of $\pm 45°$ with that of the analyzer 23.

Photoelectric detector 40 transmits an electrical signal which is a function of the intensity of the received light flux $J$. This light flux is the sum of flux $J_1$ due to the light beam 10 and the flux $J_2$ due to the light beam 20.

Let us assume that $A_1$ is the light intensity of beam 10 at the output of polarizer 11, $A_2$ that of the beam 20 at the output of polarizer 21, $\theta_1$ the angle of rotation which the polarization plane of beam 10 undergoes upon traversing body 12, and $\theta_2$ the angle of rotation which the polarization plane of beam 20 undergoes upon traversing body 22. If we neglect the transmission losses, the light fluxes $J_1$ and $J_2$ are equal to:

$$J_1 = A_1^2 \cos^2 \alpha \quad 1$$

$$J_2 = A_2^2 \cos^2 \alpha \quad 2,$$

where $\alpha_1$ is the angle which the polarization plane of the light beam 10 at the output of body 12 makes with the polarization plane of analyzer 13, and $\alpha_2$ is the angle which the polarization plane of the light beam 20 at the output of body 22 makes with the polarization plane of the analyzer 23.

$$\alpha_1 = \phi_1 + \theta_1 \quad \alpha_2 = \phi_2 + \theta_2$$

Hence:

$$J = J_1 + J_2 = A_1^2 \cos^2(\phi_1 + \theta_1) + A_2^2 \cos^2(\phi_2 + \theta_2)$$

After trigonometric transformation, we get the following:

$$J = \tfrac{1}{2}(A_1^2 + A_2^2) + \tfrac{1}{2}[A_1^2 \cos 2(\phi_1 + \theta_1) + A_2^2 \cos 2 (100_2 + \theta_2)]$$

The expression for light flux $J$ received by photoelectric detector 40 can thus be broken down into a first constant term and a second term that is a function of the angles $\theta_1$ and $\theta_2$.

Electronic servo device 50 regulates the measuring current magnitude $I_R$ so as to obtain a rotation of the polarization plane of beam 20 in body 22, so that the second term above will be zero. Consequently, when there is equilibrium, the flux received by photoelectric detector 40 will be equal to $\tfrac{1}{2}(A_1^2 + A_2^2)$, that is to say, half of the light flux which photosensitive element 40 would receive if the polarization planes of beams 10 and 20, at the outputs of the first and second bodies with magnetic rotating power, were merged with the polarization plans, respectively, of analyzers 13 and 23.

According to one possible version of the electronic servo device, the latter is made up of an isolating amplifier 51 whose input terminal is connected to the photoelectric detector 40, a subtractor 52 with two inputs, one of which is connected to the output of the isolating amplifier 51 while the other one is connected to an amplifier 53 which provides a signal corresponding to the constant term $\tfrac{1}{2}(A_1^2 + A_2^2)$, in the process suitably amplifying the signal furnished by a photoelectric detector 54, receiving a light flux proportional to this constant term, that is to say, a light flux taken either from beam 10 or beam 20 or from these two beams with the help of semireflecting plates or optical fibers, or directly from source 30 by means of a different light path, as shown at 55 in the figure, and an amplifier 56 which is controlled by the difference signal transmitted by subtractor 52 and which furnishes the power current for winding 24.

The calculation shows that the disequilibrium term of the signal transmitted by the photoelectric detector is the product of the phase shift multiplied by a coefficient, which product very slowly decreases with $\theta_2$; the sensitivity of the system is thus practically constant.

In a first version, we give the same intensities $A_1$ and $A_2$ to the light beams 10 and 20 at the output of the polarizers 11 and 21. The equilibrium of the servo device 50 is then obtained when $\theta_1$ and $\theta_2$ are equal in terms of absolute value: they are equal in terms of relative value if $\phi_1$ and $\phi_2$ are in opposite directions, and they have opposite relative values if $\phi_1$ and $\phi_2$ are in the same direction. In this case, one can proceed to a direct reading because the magnitude of the measuring current $I_R$ is equal to that of the current $I_M$ to be measured.

According to another version, we give angles $\theta_1$ and $\theta_2$ sufficiently small absolute values, that is, less than $5°$, so that one can equate the sine to the arc, and the equilibrium condition of the servo device 50 is then written as follows:

$$(A_1^2 \theta_1) = (A_2^2 \theta_2)$$

It is no longer necessary, as before, for angles $\theta_1$ and $\theta_2$ to be equal. In selecting $A_2$ larger than $A_1$, the angle $\theta_2$ will be smaller than the angle $\theta_1$, which causes the dissipation of the electrical energy in the winding 24 to be smaller than that of the measurement winding 14. The magnitude of the current $I_M$ to be measured is then proportional to that of the measuring current $I_R$.

It is noted that when angles $\phi_1$ and $\phi_2$ are in the same direction, the direction of the measuring current $I_R$ is such that the rotation of beam 20 in body 22 and the rotation of beam 10 in body 12 will be in opposite directions. In the case where $\phi_1$ and $\phi_2$ are in opposite directions, the direction of the measuring current $I_R$ is such that the rotation of beam 20 in body 22 and the rotation of beam 10 in body 12 will be in the same direction.

The optical current transformer, which is the object of this invention, can be applied particularly advantageously in measuring the current of a high or very high voltage line.

I claim:

1. An optical current transformer comprising:
    a. a first light path comprising in sequence:
        a first polarizer,
        a first magneto-optical element subject to a magnetic field produced by a current to be measured,
        a first analyzer whose polarization plane forms an angle of 45° with the polarization plane of said first polarizer,
        a photoelectric detector for generating a control signal dependent upon the intensity of light impinging thereon;
    b. a second light path comprising in sequence:
        a second polarizer,
        a second magneto-optical element subject to a magnetic field produced by a measuring current,
        a second analyzer whose polarization plane forms an angle of 45° with said second polarizer, and
        said photoelectric detector;

c. means for generating first and second light beams along said first and second paths, respectively, so that said beams impinge upon said photoelectric detector;

d. electronic means responsive to said control current for controlling said measuring current as a function of the intensity of light impinging upon said photodetector to maintain the intensity at a constant value equal to one half of the intensity which would impinge upon said photodetector if the polarization planes of said first and second light beams at the outputs of said first and second magneto-optical elements were merged, respectively, with the polarization planes of said first and second analyzers.

2. An optical current transformer according to claim 1 wherein said first and second light beams have the same intensity at the outputs of said first and second polarizers.

3. An optical current transformer according to claim 1 wherein the planes of polarization of said first and second light beams are rotated through an angle of less than 5° by said first and second polarizers, respectively, and wherein the intensity of said first light beam at the output of said second polarizer.

4. An optical current transformer according to claim 1 wherein said electronic means comprises subtractor circuit means responsive to said control signal and to a signal representative of said constant value for controlling said measuring current.

* * * * *